(12) United States Patent
Mizutani et al.

(10) Patent No.: US 9,699,026 B2
(45) Date of Patent: Jul. 4, 2017

(54) DISTRIBUTED PROCESSING SYSTEM

(71) Applicant: Hitachi, Ltd., Tokyo (JP)

(72) Inventors: Izumi Mizutani, Tokyo (JP);
Masafumi Kinoshita, Tokyo (JP);
Naoki Haraguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 401 days.

(21) Appl. No.: 14/555,005

(22) Filed: Nov. 26, 2014

(65) Prior Publication Data
US 2015/0149603 A1   May 28, 2015

(30) Foreign Application Priority Data

Nov. 28, 2013  (JP) .................................. 2013-245576

(51) Int. Cl.
*G06F 15/177* (2006.01)
*H04L 12/24* (2006.01)

(52) U.S. Cl.
CPC ...... *H04L 41/0813* (2013.01); *H04L 41/0866* (2013.01)

(58) Field of Classification Search
USPC ........................................................ 709/220
See application file for complete search history.

(56) References Cited

FOREIGN PATENT DOCUMENTS

JP      2001-356950 A      12/2001
JP      2011-171867 A       9/2011

*Primary Examiner* — Hee Soo Kim
(74) *Attorney, Agent, or Firm* — Volpe and Koenig, P.C.

(57) ABSTRACT

There is provided a distributed processing system including: a data store server for storing data; a data store part for storing data in the data store server; a data acquisition part for obtaining data from the data store server; and an operation manager part for performing configuration change on the whole system. The distributed processing system has a function of managing the configuration content and the configuration order for each device according to the change content, to determine the target and order to be configured based on the managed information by the operation manager part. Further, the distributed processing system has a function of performing a configuration change process on the data store part, the data acquisition part, and the data store server by the operation manager part.

13 Claims, 17 Drawing Sheets

F I G . 1
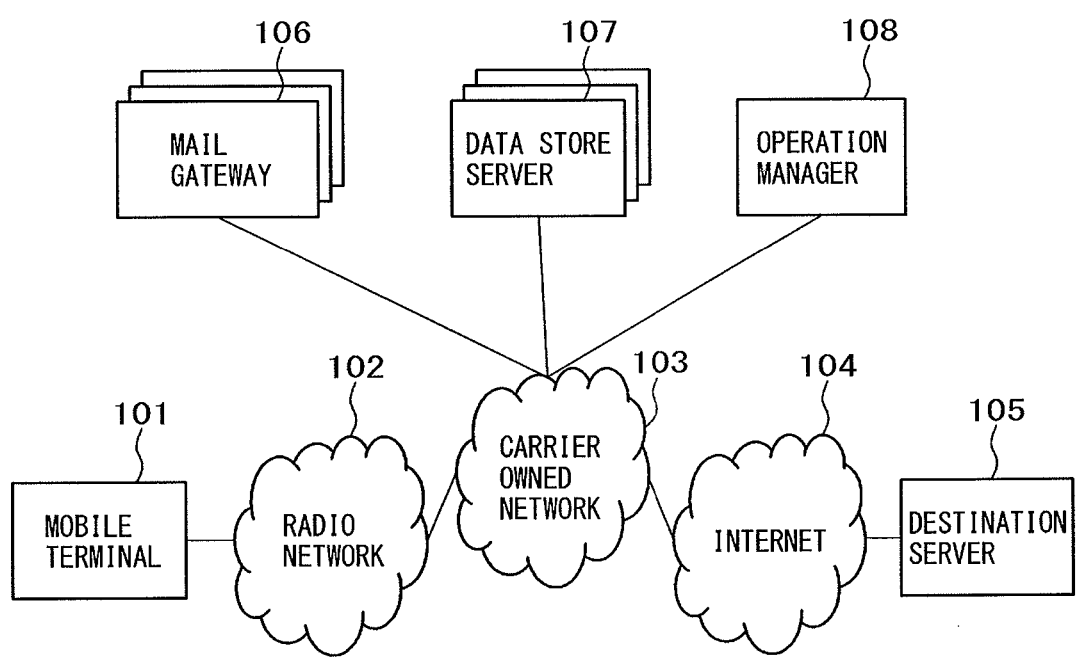

FIG.5

```
#command     action                    only_app    only_store    all
add_que      add_que                   D, A        -             D, C, E
del_que      del_que                   A           -             C, D, E
change_A     change_param              -           B             D, E
change_B     change_param              C           -             C, E
change_C     change_param              -           -             E
add_store    add_store                 -           -             B, E
init         add_que                   -           -             D, C, E
reload       del_que, add_que          -           -             C, D/D, C, E
:
```

```
#a_code         code    arg
only_mail_app   A       Y
only_store      B       Y
all_mail_app    C       N
all_store       D       N
file            E       N
:
```

| #name | ip-address | port |
|---|---|---|
| appA | 192.168.2.1 | 9000 |
| appB | 192.168.2.2 | 9001 |
| appC | 192.168.2.3 | 9002 |
| : | | |

421

| #name | ip-address | port |
|---|---|---|
| storeA | 192.168.1.1 | 8000 |
| storeB | 192.168.1.2 | 8001 |
| storeC | 192.168.1.3 | 8002 |
| : | | |

422

| #name | paramA | paramB | paramC |
|---|---|---|---|
| queueA | 1 | 0.5 | 10000 |
| queueB | 0 | 0.4 | 12000 |
| queueC | 1 | 0.6 | 10000 |
| : | | | |

```
1  #input
2  command = get_user_input();
3
4  #call method
5  action = get_action(command);
6  codes = get_codes(command);
7  show_method(action, codes);
8  if(check_exec() == NO) exit();
9  exec(action, codes);
10 ...
11
12
13 #exec method
14 exec(action **action, code **code) {
15 for(i = 0; i < size(action); i++)
16         for(j = 0; j < size(code); j++)
17                 action[i](code[j]);
18 }
19
20 #add_que method
21 add_que(code* code) {
22     #all_mail_app
23     if(code->name == "all_mail_app") {
24         ...
25     }
26
27     #all store
28     if(code->name == "all_store") {
29         ...
30     }
31
32     #only_mail_app
33     if(code->name == "only_mail_app") {
34         arg = code->getarg();
35         ...
36     }
37
38     #all store
39     if(code->name == "only_store") {
40         arg = code->getarg();
41         ...
42     }
43
44     #file
45     if(code->name == "file") {
46         ...
47     }
48
49 }
50
```

FIG.10

OPERATION MANAGER APPLICATION GUI

SYSTEM CONFIGURATION

| QUEUE NAME | STORE CONDITION | PARAMETER A | PARAMETER B | PARAMETER C | |
|---|---|---|---|---|---|
| QUEUE A | *@test.ne.jp | 1 | 0.5 | 10000 | CHANGE |
| QUEUE B | *@test2.ne.jp | 0 | 0.8 | 15000 | CHANGE |
| | | | | | ADD |

PART CONFIGURATION AND CURRENT OPERATIONAL STATE

MAIL GATEWAY 1 — 193.168.1.1 (port:...)
- QUEUE A
- QUEUE B
- DELETE
- LOAD: 20...

MAIL GATEWAY — 193.168.1.2

MAIL GATEWAY — 193.168.1.3
- QUEUE A
- QUEUE B
- DELETE
- LOAD: 40%
- QUEUE A: 10/40
- QUEUE B: 30/50

Popup (1002):

| QUEUE NAME | STORE CONDITION | PARAMETER A | PARAMETER B | PARAMETER C | |
|---|---|---|---|---|---|
| QUEUE A | *@test.ne.jp | 1 | 0.5 | 10000 | CHANGE |
| QUEUE B | *@test2.ne.jp | 0 | 0.8 | 15000 | CHANGE |
| | | | | | ADD |

DATA STORE SERVER 1-1 — 192.16... (port:...)
- QUEUE A
- QUEUE B
- DELETE
- LOAD: 20%
- QUEUE A: 10/40
- QUEUE B: 30/50

Center box:
- QUEUE A
- QUEUE B
- DELETE
- LOAD: 40%
- QUEUE A: 10/40
- QUEUE B: 30/50

Right box:
- QUEUE A
- QUEUE B
- DELETE
- LOAD: 40%
- QUEUE A: 10/40
- QUEUE B: 30/50

DATA STORE SERVER 1-2 — 192.168.3.1 (port:8000)
- QUEUE A
- QUEUE B
- DELETE
- LOAD: 20%
- QUEUE A: 15/40
- QUEUE B: 40/50

DATA STORE SERVER 2-2 — 192.168.3.2 (port:8001)
- QUEUE A
- QUEUE B
- DELETE
- LOAD: 20%
- QUEUE A: 15/40
- QUEUE B: 40/50

DATA STORE SERVER 3-2 — 192.168.3.3 (port:8002)
- QUEUE A
- QUEUE B
- DELETE
- LOAD: 20%
- QUEUE A: 15/40
- QUEUE B: 40/50

| SERVER TYPE | IP ADDRESS | PORT NUMBER | |
|---|---|---|---|
| | | | ADD |

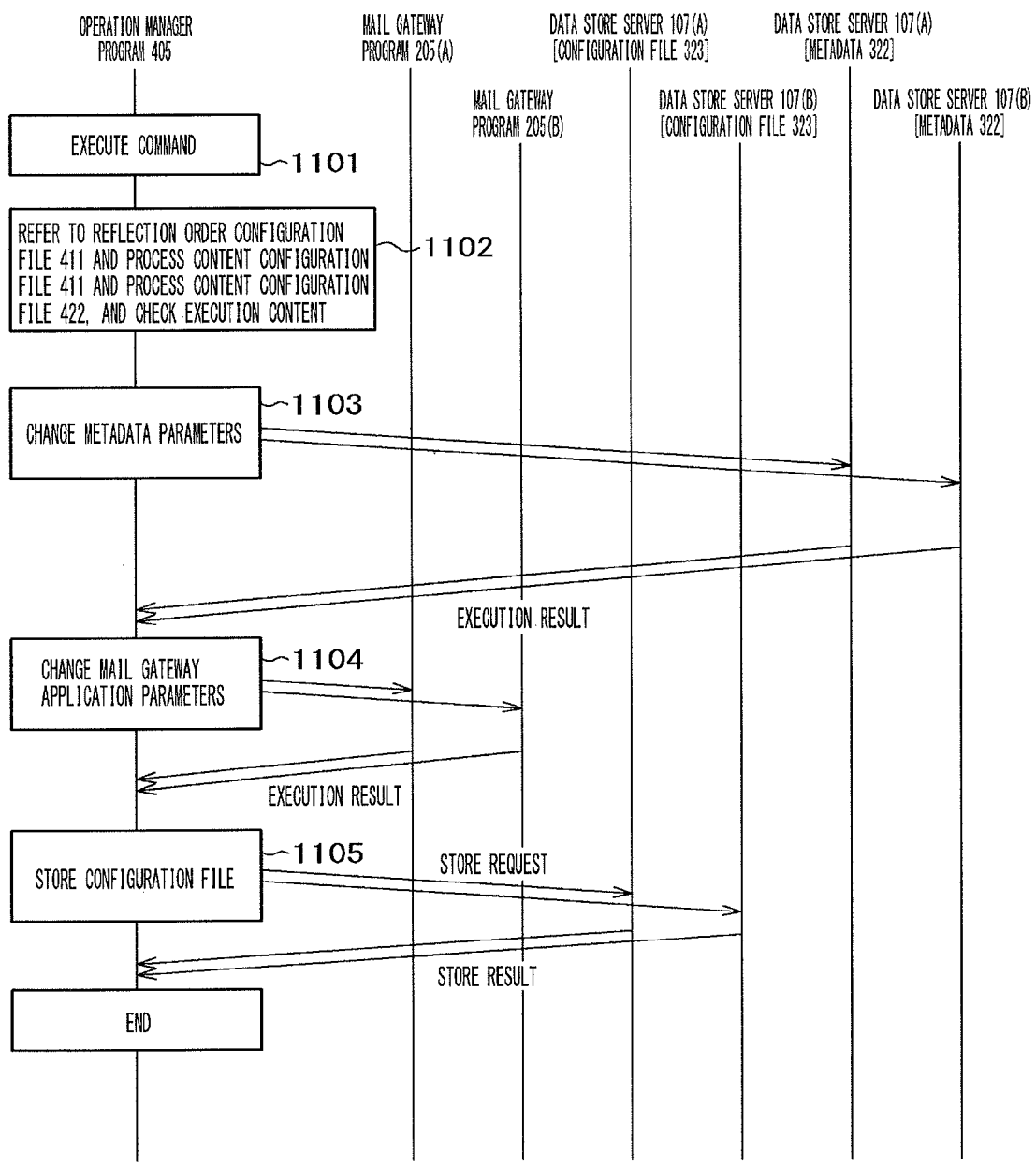

DISTRIBUTED PROCESSING SYSTEM

CLAIM OF PRIORITY

The present application claims priority from Japanese application serial no. JP2013-245576, filed on Nov. 28, 2013, the content of which is hereby incorporated by reference into this application.

BACKGROUND

The subject matter disclosed in this specification relates to a system configuration method for a distributed processing system.

There is known a method for increasing the reliability of the system by performing a process for switching a main server in which a failure occurred to a standby server (hereinafter, referred to as system switching), to continue the process in the standby server. However, this method has a possibility of failing in transferring information from the main server to the standby server and in the server switching process. Thus, there was a concern that failure could lead to an accident in the failure recovery by a method using the system switching.

In order to prevent system failure in the failover processing, more and more systems are being distributed using a server device (hereinafter referred to as a data store server) for storing data, which is provided in addition to the main server for performing processing.

A distributed processing system using a data store server includes: multiple main servers for performing the preceding process for storing data in the data store server, and the subsequent process for obtaining data from the data store server; and the data store server for storing data.

The data used by the multiple main servers that performs the preceding and subsequent processes is shared on the data store server, so that there is no need to transfer the data when a failure occurs. Further, there is the advantage that the distribution of the whole system can eliminate the need to perform the switching process in the occurrence of a failure.

Patent Document 1 (Japanese Patent Application Laid-Open No. 2011-171867) describes an example of a distributed processing system involving message processing.

Not only in the distributed processing system but also in IT systems, various system configuration requests occur when the system is started or during the system operation. For example, in the distributed messaging system described in Patent Document 1, as set forth in paragraphs 0057 to 0058 and 0108 to 0109, there may be a request specific to the messaging system, such as that a particular queue wants to perform message transmission as a priority. In response to this request, the system configuration requests occur such as addition and deletion of queues and changes in configuration values.

In the system configuration for a distributed processing system in which a main server and a data store server operate in conjunction with each other, a configuration process managed as one system may be required for both the data store server and the main server for performing the preceding and subsequent processes.

In paragraphs 0024 to 0025 of Patent Document 2 (Japanese Patent Application Laid-Open No. 2001-356950), there is disclosed a technique in which a store server is provided, in addition to multiple servers on which applications run, to synchronize data through the store server if there is a difference in the information content between the applications in each of the servers. By using this technique, it is possible to synchronize the configuration data between the main server and the data store server.

SUMMARY

When a system configuration is performed in a distributed processing system in which multiple devices operate in conjunction with each other, the measures must be considered, such as, for example, configuring the main server after completion of the configuration of the data store server, in order to prevent the system from malfunctioning. For this reason, it is necessary to determine the configuration order of the device according to the content of the system configuration.

However, the technique described in Patent Document 2 is designed to perform autonomous data synchronization by the application. Thus, if this technique is used, there is a risk of system failure without consideration of the configuration order between the main server and the data store server according to the content of the system configuration.

Disclosed in the present invention is a method used in a system configuration of a distributed processing system using a data store server for storing data, including the steps of managing the configuration content and configuration order of each device according to the system configuration content, and performing the system configuration so as not to cause malfunction of the system, based on the managed information. The present invention also discloses a distributed system using such a method.

More specifically, an embodiment disclosed herein is a distributed processing system including: multiple data store servers for storing data; multiple process servers for performing data storing process and data acquisition process with the data store server; and an operation manager for performing configuration process involving system configuration for the process server and the data store server. The data store server or the operation manager manages configuration order information (for example, a configuration order configuration file and a process content configuration file) of the process server and the data store server, with respect to each system configuration content. The operation manager determines the configuration process required for the system configuration, as well as the execution order of the particular configuration process, according to the required system configuration content. Then, the operation manager performs the determined configuration process on the process server and the data store server, according to the determined execution order.

Further, it is possible to configure the distributed processing system such that the determined configuration process performed includes a process for storing the configuration order information in the data store server. When the configuration content is changed, the operation manager obtains the stored configuration order information from the data store server, and determines the configuration process required for system change as well as the execution order of the particular configuration process, based on the obtained configuration order information and on the required system change content.

Further, it is possible to configure the operation manager to check the validity of the required system change content, based on the obtained configuration order information and on the required system change content.

Further, it is possible to configure the operation manager to obtain the configuration content from multiple process servers including a process server as the reference and from multiple data store servers including a data store server as the reference, and to check the necessity of the configuration process by calculating the difference between the configuration content obtained from the reference process server and the reference data store server, and the required system change content. When the system change process is necessary for either one or both of the process server and the data store server, the operation manager determines the configuration process required for the system change in the server, which is the target of the system change process, and in the particular server, as well as the execution order of the particular configuration process.

Further, it is possible to configure the configuration order information that the data store server or the operation manager manages, to include the process name to be performed, the process target (or the identifier) which is the argument for performing the process, and the execution order (process procedure) information of the process using the argument, with respect to each command name specified in the configuration process.

Further, it is possible to configure the distributed processing system to include multiple operation managers, in such a way that the data store server manages the configuration order information so that the configuration order information can be accessed from the multiple operation managers.

Further, it is possible to configure the distributed processing system to include a configuration possibility determination server for determining the possibility of the configuration process that the operation manager will perform, in such a way that the operation manager inquires to the configuration possibility decision server about whether the determined configuration process is possible, before the determined configuration process is performed.

According to the disclosure, it is possible to perform a system configuration so as not to cause malfunction in a distributed system using a data store server.

BRIEF DESCRIPTION OF THE DRAWINGS

FIG. 1 shows an example of the system configuration according to a first embodiment;

FIG. 5 shows an example of the contents of a configuration order configuration file 411 and a process content configuration file 412, which are present in a non-volatile store part 407 on the operation manager 108 according to the first embodiment;

FIG. 6 shows an example of the contents of a mail gateway configuration file 421, a data store server configuration file 422, and a queue configuration file 423, which are present in the non-volatile store part 407 on the operation manager 108 according to the first embodiment;

FIG. 8 shows an example of the pseudocode for implementing an operation manager application 405 of the operation manager 108 according to the first embodiment;

FIG. 10 shows an example of the GUI screen when the operation manager application 405 of the operation manager 108 is performed, according to the first embodiment;

FIG. 11 shows an example of the initial configuration sequence according to the first embodiment;

DETAILED DESCRIPTION

Figure 2:
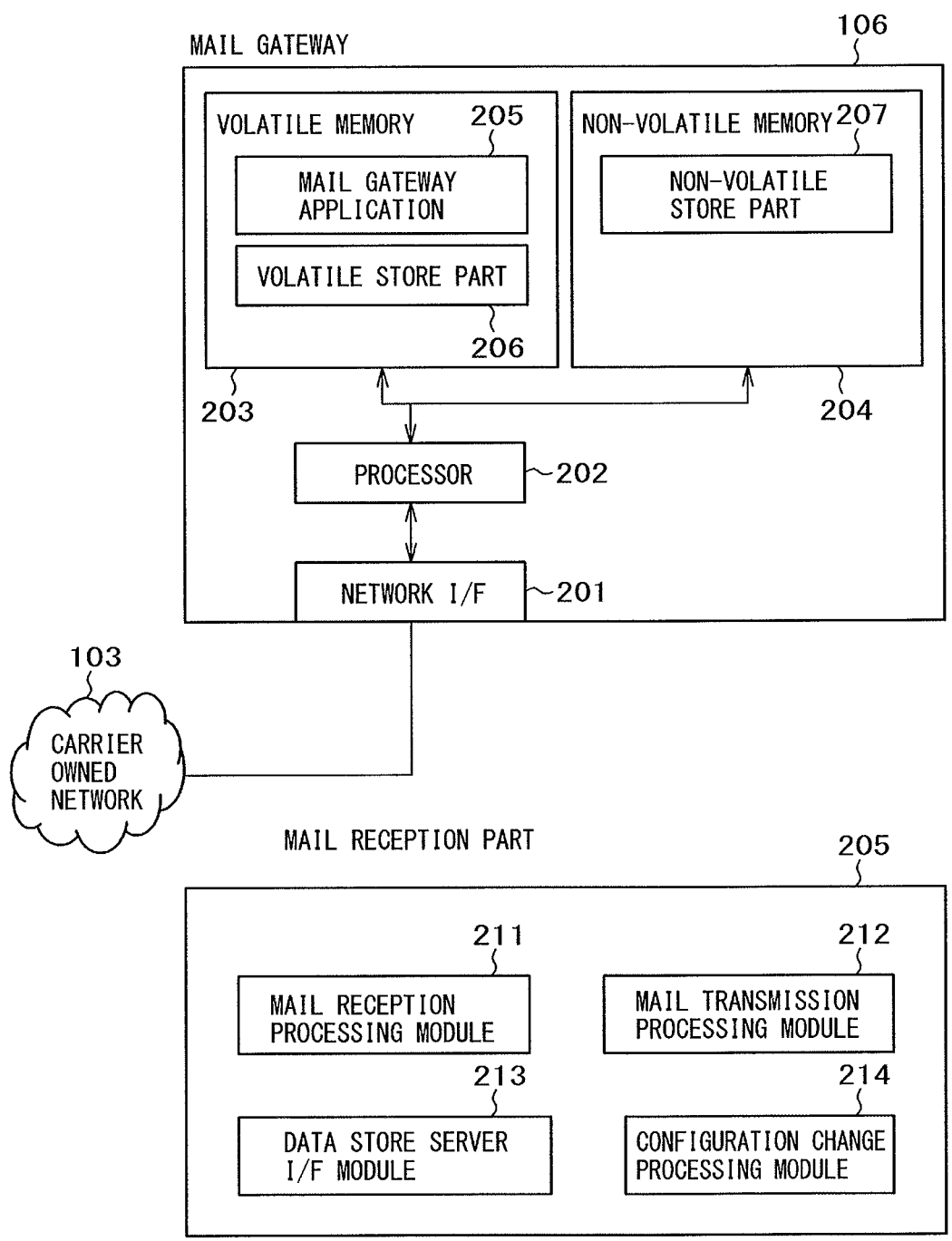
FIG. 2 shows an example of the configuration of a mail gateway 106 according to the first embodiment.

Hereinafter, preferred embodiments of the present invention will be described. In the following description, a distributed messaging system is cited as an example of a distributed processing system in which a data store server and a process server operate in conjunction with each other, and mail is also cited as an example of a message.

FIG. 1 is an example of the system configuration according to a first embodiment of the present invention.

A mobile terminal 101 is coupled to a carrier owned network 103 through a radio network 102. The radio network 102 is a wireless network coupling the mobile terminal 101 and the carrier owned network 103. The carrier owned network 103 is a network coupling the radio network 102, an internet 104, a mail gateway 106 which is an example of the process server, a data store server 107, and an operation manager 108.

A destination server 105 transmits and receives mail to and from the mail gateway 106 through the internet 104. The mail gateway 106 is coupled to the carrier owned network 103. The mail gateway 106 receives mail that the mobile terminal 101 transmits to the carrier owned network 103, and stores the received mail in the data store server 108. Then, the mail gateway 106 obtains the mail from the data store server 108 and transmits to the destination server 105.

In the present embodiment, the load is distributed in multiple gateways 106. Each specific one of the gateways is represented by a number with a letter of the alphabet, such as a mail gateway 106a, and they are collectively designated by the reference numeral 106 without a suffix. Further, the mail gateway 106 can be operated by a different server by separating the mail reception function and the mail transmission function. The data store server 107 is coupled to the carrier owned network 103. The data store server 107 receives data such as mail from the mail gateway 106, and stores the received data. Here, the data store server 107 is a message store represented by an in-memory KVS, and the like.

In the present embodiment, the load is distributed in multiple data store servers 107. Each one of the data store servers is represented by a number with a letter of the alphabet, such as a data store server 107a, and they are collectively designated by the reference numeral 107 without a suffix. Further, in order to prevent the loss of the data stored in the data store server 107a, the data stored in the data store server 107a is redundant for the multiple data store servers.

The operation manager 108 is coupled to the carrier owned network 103. The operation manager 108 performs a configuration change process on the mail gateway 106, and performs a configuration change process on the data store server 107. In addition, the operation manager 108 stores the configuration state in the data store server 107. While the figure shows one operation manager 108, multiple operation managers may also be present.

In the present embodiment, the mail gateway 106 is shown as a server for processing message. However, it is also possible that the system configuration has a message process server for performing a process different from that of the mail gateway 106. In this case, similar to the mail gateway 106, a certain message process server is coupled to the carrier owned network 103 to store a message in the data store server 107 and obtain the stored message from the data store server 107.

FIG. 2 shows the hardware configuration of an information processing device for implementing the mail gateway 106.

The information processing device for implementing the mail gateway 106 includes a network T/F 201, a processor 202, a volatile memory 203, a non-volatile memory 204, and an internal communication line such as a bus for connecting these components. The mail gateway 106 is coupled to the carrier owned network 103 through the network IF 201.

The volatile memory 203 stores a mail gateway application program (hereinafter referred to as a mail gateway application) 205. Further, the volatile memory 203 includes a volatile store part 206 for storing data.

The mail gateway application 205 includes programs for implementing a mail reception processing module 211, a mail transmission processing module 212, a data store server I/F module 213, and a configuration change processing module 214. The mail reception processing module 211 implements a process for the mail gateway 106 to receive a mail from the mobile terminal 101. The mail transmission processing module 212 implements a process to transmit the mail obtained from the data store server 107 to the destination server 105.

These programs are executed by the processor 202 to implement each of the process parts described below.

The distributed messaging system has no state on the mail gateway application by using the data store server. In the past there has existed a queue for exchanging data to be transmitted and received between the mail reception processing module 211 and the mail transmission processing module 212, on the mail gateway 106 or the backup store connected to the mail gateway 106, and the like. However, in the present embodiment, the exchange of the data between the mail reception processing module 211 and the mail transmission processing module 212 is performed through the data store server 107.

The data store server I/F module 213 stores various control programs for implementing a process for storing the received mail to the data store server 107, as well as a process for obtaining the mail from the data store server 107. The control programs stored in the data store server I/F module 213 are executed by the processor 202.

The configuration change processing module 214 stores various control programs for implementing a process for receiving a configuration change request from the operation manager 108, and changing the configuration value required for the operation of the mail gateway application 205. The control programs stored in the configuration change processing module 214 are executed by the processor 202.

The non-volatile memory 204 includes the non-volatile store part 207. The non-volatile store part 207 stores the data managed by the mail gateway application 205.

Figure 3:
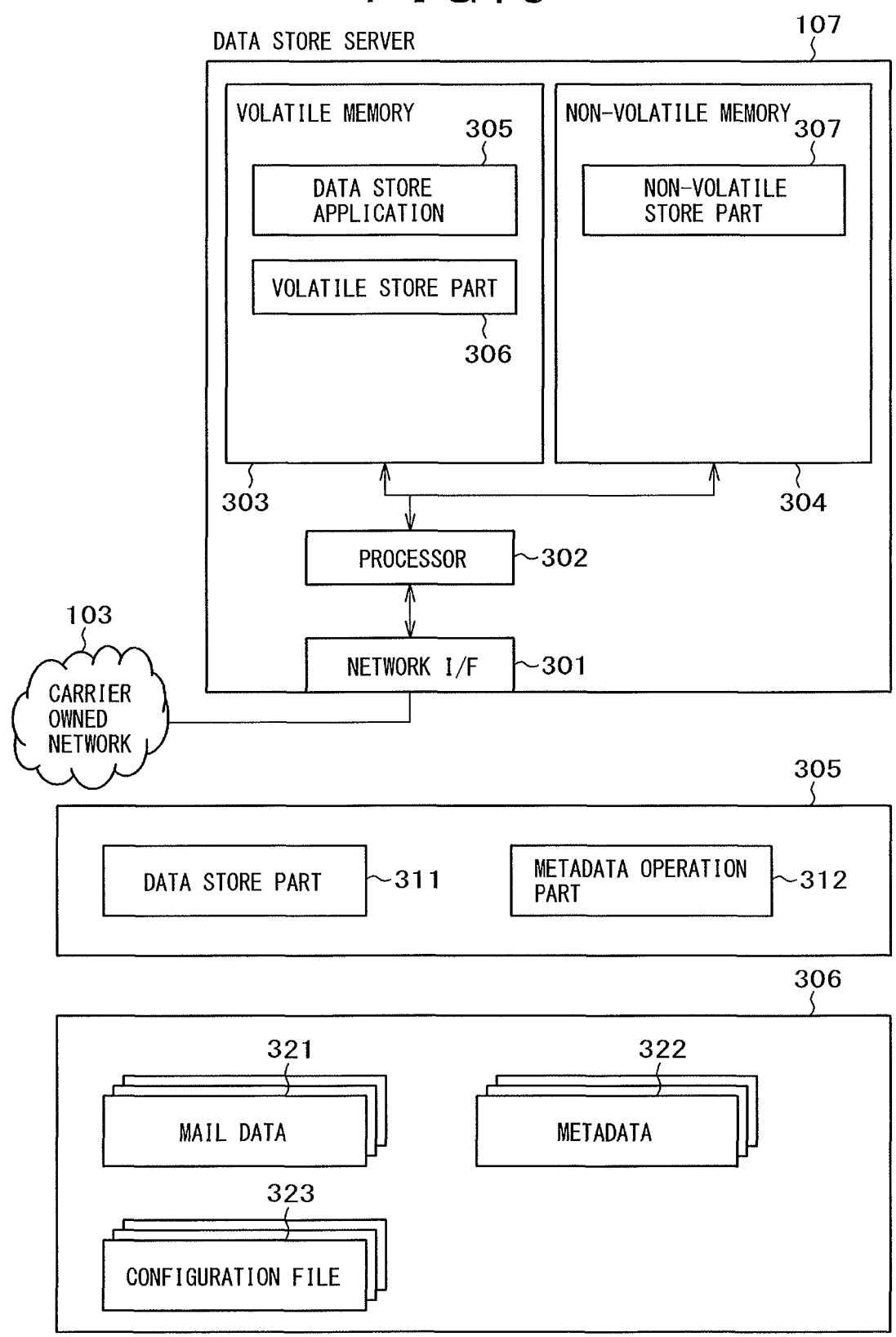
FIG. 3 shows an example of the configuration of a data store server 107 according to the first embodiment.

FIG. 3 shows the hardware configuration of the information processing device for implementing the data store server 107.

The information processing device for implementing the data store server 107 includes a network I/F 301, a processor 302, a volatile memory 303, a non-volatile memory 304, and an internal communication line such as a bus for connecting these components. The data store server 107 is coupled to the carrier owned network 103 through the network I/F 301.

The volatile memory 303 stores a data store application program 305 (hereinafter referred to as a data store application), and includes a volatile store part 306 for storing data. The data store application 305 includes programs for implementing a data store part 311 and a metadata operation part 312.

The data store part 311 performs the operation involving VALUE in the data store application 305, such as a process for storing a pair of VALUE and KEY that the data store server 107 received from the mail gateway 106 to the volatile store part 306, or a process for returning VALUE corresponding to KEY that the data store server 107 received from the mail gateway 106, or a process for deleting Value corresponding to Key that the data store server 107 received from the mail gateway 106.

The metadata operation part 312 performs the operation involving a metadata 322 in the data store application program 305, such as generation, update, or deletion of the metadata 322. The metadata operation part 312 stores a sires of processes for the generation, update, or deletion of the metadata 322, in combination with the basic operation for VALUE of the data store part 311.

The volatile store part 306 stores the data managed by the data store application 305.

The non-volatile memory 304 includes a non-volatile store part 307. The non-volatile store part 307 stores the data managed by the data store application 305.

A mail data 321 is the data that the data store application 305 stored.

The metadata 322 is the data including information for managing the order of the mail data 321 that the data store application 305 stored. The metadata 322 is handled by the metadata operation part 312.

A configuration file 323 is a file showing the configuration value (parameter) of the whole system. An operation manager configuration file 413 on the non-volatile store part 407 of the operation manager 108 is stored as the configuration file 323 by the operation manager application 405 of the operation manager 108. The configuration file is described in detail below in the description of the operation manager configuration file 413.

Figure 4:
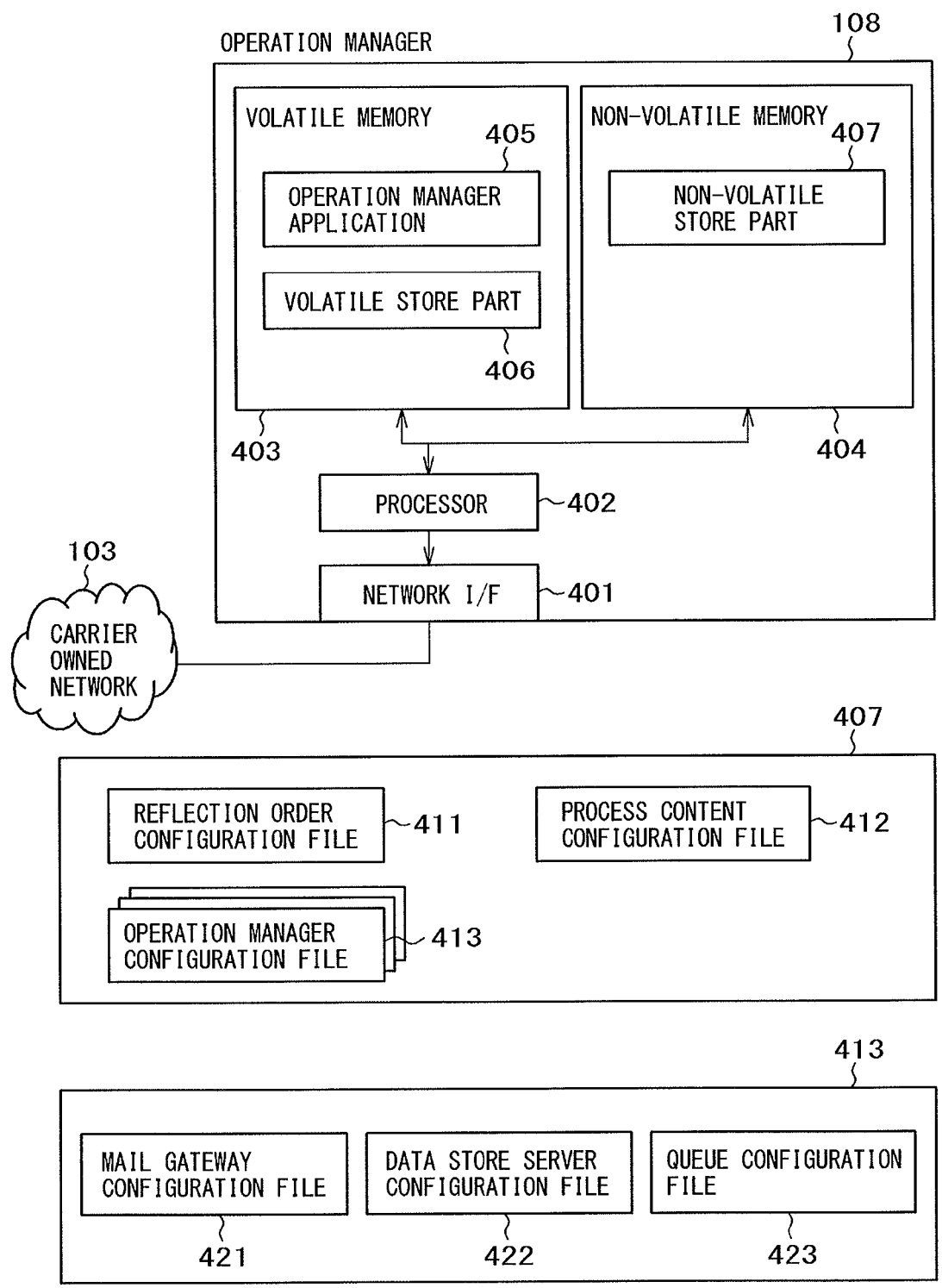
FIG. 4 shows an example of the configuration of an operation manager 108 according to the first embodiment.

FIG. 4 shows the hardware configuration of the information processing device for implementing the operation manager 108.

The information processing device for implementing the operation manager 108 includes a network I/F 401, a processor 402, a volatile memory 403, a non-volatile memory 404, and an internal communication line such as a bus for connecting these components. The operation manager 108 is coupled to the carrier owned network 103 through the network I/F 401.

The volatile memory 403 includes an operation manager application program (hereinafter referred to as an operation manager application) 405, and a volatile store part 406 for storing data. The operation manager application 405 is a program for first receiving an input from an operator who performs a configuration change, and then implementing the configuration change process on the mail gateway 106 and the data store server 107. The operation manager application 405 is executed by the processor 402 to implement the functions described below.

The volatile store part 406 stores the data managed by the operation manager application 405.

The non-volatile memory 404 includes the non-volatile store part 407. The non-volatile store part 407 stores the data managed by the operation manager application 405. The non-volatile store part 407 also stores the configuration order information including the configuration order configuration file 411 and the process content configuration file 412, as well as the operation manager configuration file 413.

The configuration order configuration file 411 descries the details of each of the configuration change processes. The process content configuration file 412 defines the process procedure described in the configuration order configuration file 411. These files will be described separately with reference to FIG. 5.

The operation manager configuration file 413 is a file showing the configuration value of the whole system, which is used when the configuration change is performed by the operation manager application 405. The operation manager configuration file 413 includes a mail gateway configuration file 421, a data store server configuration file 422, and a queue configuration file 423. The operation manager configuration file 413 is stored as the operation manager configuration file on the volatile store part 306 on the data store server 107, in response to a request of the data store application 305 of the data store server 107 from the operation manager application 405.

The mail gateway configuration file 421 includes information related to the mail gateway. The data store server configuration file 422 includes information related to the data store server. The queue configuration file 423 includes the queue information of the whole system. These three files will be described separately with reference to FIG. 6.

FIG. 5 is a view of an example of the contents of the configuration order configuration file 411 and the process content configuration file 412, which are included in the configuration order information stored in the non-volatile store part 407. Note that the first line started with # in the configuration order configuration file 411 and in the process content configuration file 412 in FIG. 5, is a comment line showing the explanation and annotation of the contents of each file.

One line of the configuration order configuration file 411 includes: the command name (command) specified by the operator in the system configuration; the process (action) name that is performed when the specified command process is implemented; the process target (or the identifier (code)) which is the argument for performing the process (action); and the specification of the execution order (process procedure) of the process (action) using the argument. With respect to the execution order, it is possible to provide rules such as executing the described multiple process targets from the left.

The specification of the process targets as arguments and the execution order using the arguments includes, for example, the case of specifying process servers as the target, the case of specifying data store servers as the target, and the case of specifying both process servers and data store servers as the target.

In the configuration order configuration file 411, for example, the definition shown in the process content configuration file 412 is used to specify process targets as arguments by identifiers (codes). Further, if the process (action) is not performed, or if it is not desired to permit the change, a mark with the meaning, for example, - (hyphen) is appended to the item of each of the various process procedures.

For example, the process name to be performed (action) specifies a method name defined in the operation manager application 405 that implements the particular process. Here, multiple process names can be specified for the process name to be performed (action). In such a case, the process targets as arguments and execution orders are separated using any delimiter (for example, /) to specify each process name (action).

The process content configuration file 412 is used for specifying process targets used as arguments by identifiers. The process content configuration file 412 includes information on each process target name, the identifier of the particular process, and whether the particular process target requires an individual argument. The configuration order configuration file 411 and the process content configuration file 412 are referred to when the operation manager application 405 of the operation manager 108 performs a configuration on the mail gateway application 205 of the mail gateway 106 and on the data store application 305 of the data store server 107.

For example, it is assumed that a configuration change request (add_que) arrives to add a queue to all mail gateway applications and all data store servers. In this case, the operation manager application 405 of the operation manager 108 first refers to the configuration order configuration file 411. Then, the operation manager application 405 finds that the process name to be performed (action) is "add_que", and the queue addition procedure to all mail gateway applications and all data store servers is the execution of "add_que" with the process targets represented by the codes D, C and E as the arguments.

Next, by referring to the process content configuration file 412, the operation manager application 405 of the operation manager 108 finds that the code D means that all data store servers are treated as the process target (all_store), the code C means that all mail gateway applications are treated as the process target (all_mail_app), and the code E means that the configuration file is treated as the process target (file).

Note that the configuration order configuration file 411 and the process content configuration file 412 can be merged into a single file.

Then, the operation manager application 405 performs "add_que", which is the process name to be performed (action), by the following steps. First, the operation manager application 405 performs "add_que" with the process target "all_store" defined as the code D in the process content configuration file 412, as the argument. Next, the operation manager application 405 performs "add_que" with the process target "all_mail_app" defined as the code C in the process content configuration file 412, as the argument. Finally, the operation manager application 405 performs "add_que" with the process target "file" defined as the code E in the process content configuration file 412, as the argument. The method for implementing the process name to be performed (action) capable of the above process will be described in detail with reference to FIG. 8.

As a result, the operation manager application 405 of the operation manager 108 performs the queue addition process on all data store servers, the queue addition process on all mail gateway applications, and the queue addition process on the configuration file, in this order. Then, the queue addition process on all mail gateway applications and on all data store servers is completed normally.

The contents of the configuration order configuration file 411 and the process content configuration file 412 may be described in the operation manager application 405, or as described in the present embodiment, it can be stored in the non-volatile store part 407 of the operation manager 108 and read from the non-volatile store part 407 when the operation manager application 405 is started.

It is also possible that the configuration order configuration file 411 and the process content configuration file 412 are stored in the volatile store part 306 that the data store application 305 of the data store server 107 manages, and are shared (namely, readable) by the whole system. In this case, the operation manager application 405 of any of the multiple operation managers 108 can read the contents of the configuration order configuration file 411 and the process content configuration file 412.

The configuration order configuration file 411 and the process content configuration file 412 can be described in the operation manager application 405 as described above. However, when these files are stored outside, the configuration change procedure can be changed only by changing the definition information in the file. As a result, the flexibility of the operation manager application 405 can be increased.

In the present embodiment, the mail gateway 106 is designated as a server to process a message, so that the configuration order configuration file 411 defines the following three process procedures: the process procedure for the specification of an application, the process procedure for the specification of a data store server, and the process procedure for the change to all applications and all data store servers. However, if there is provided a message process server that performs a process different from that of the mail gateway 106, it is necessary to have a new process procedure for the specification of the message process server that performs the different process.

FIG. 6 is a view of an example of the contents of the mail gateway configuration file 421, the data store server configuration file 422, and the queue configuration file 423 shown in FIG. 6, which are present in the non-volatile store part 407 on the operation manager 108. Note that the first line started with # in the mail gateway configuration file 421, the data store server configuration file 422, and the queue configuration file 423, is a comment line showing the explanation and annotation of the contents of each file.

The mail gateway configuration file 421 descries the information on the IP address and port for each mail gateway 106. The figure shows information on multiple mail gateways 106. The number of lines is equal to the number of mail gateways 106 in the system. Thus, if there is only one mail gateway 106 in the system, only one line of configuration information is described in the mail gateway configuration file 421. In this way, it is designed to perform the configuration change process on the mail gateway 106 described in the mail gateway configuration file 421 by the operation manager application 405 of the operation manager 108.

The data store server configuration file 422 describes information on the IP address and port for each data store server 107. The figure shows information on multiple data store servers 107. The number of lines is equal to the number of data store servers 107 in the system. Thus, if there is only one data store server 107 in the system, only one line of configuration information is described in the data store server configuration file 422. In this way, it is designed to perform the configuration change process on the data store server 107 described in the data store server configuration file 422 by the operation manager application 405 of the operation manager 108.

The queue configuration file 423 describes the configuration values of parameters for each queue. The values described here are the configuration values of the queues generated for the mail gateway 106 and the data store server 107, which are described in the mail gateway configuration file 421 and the data store server configuration file 422.

In the present embodiment, only the mail gateway 106 is designated as a server for processing a message. However, if there is provided a message process server that performs a process different from that of the mail gateway 106, it is necessary to have an additional configuration file for the message process server that performs the different process.

Figure 7:
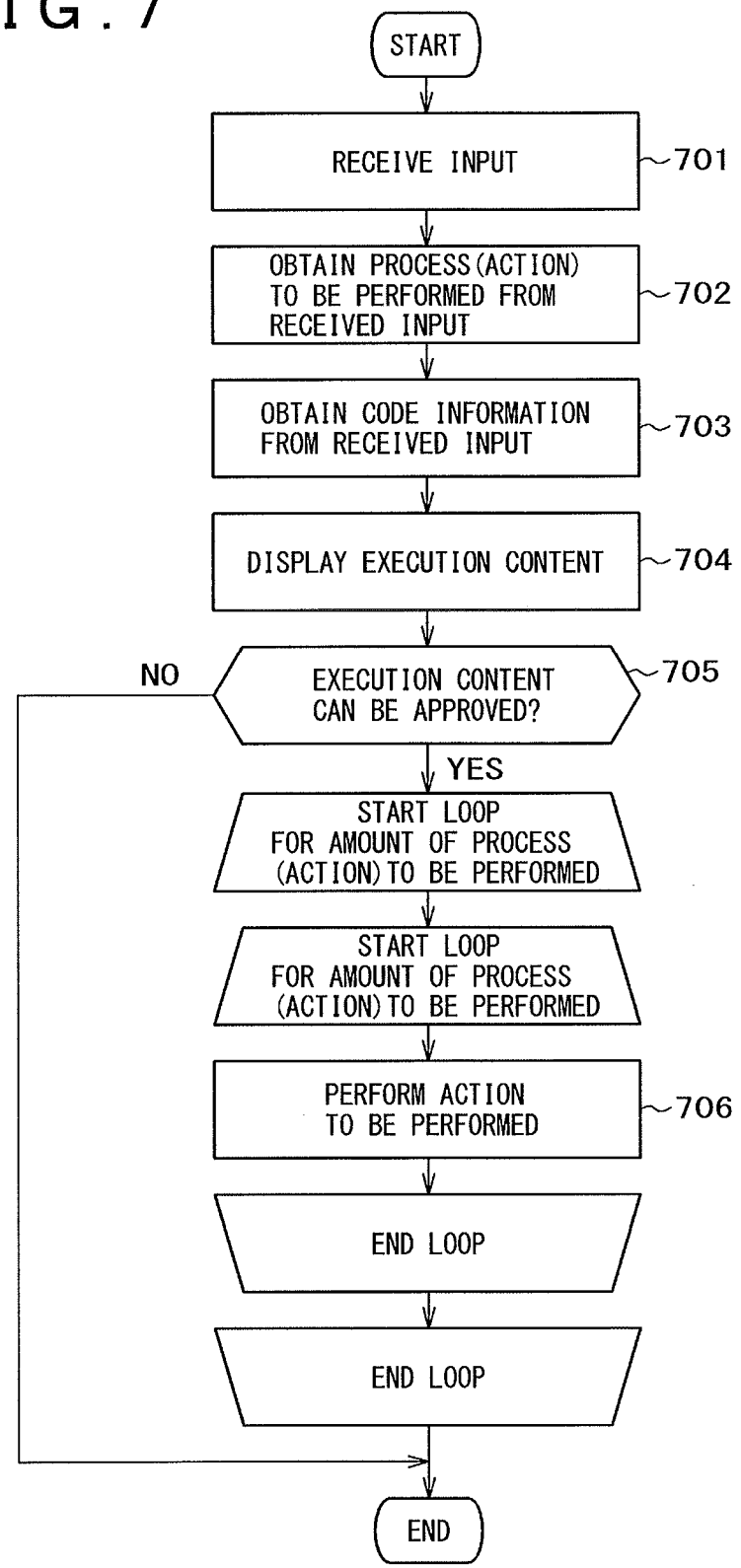
FIG. 7 shows an example of a flow chart of the process for determining the process procedure and process content for the configuration change, and performing the configuration change process according to the first embodiment.

FIG. 7 is a flow chart of the process of the operation manager application 405 of the operation manager 108, including the steps of receiving an input, determining the process procedure and the process content based on the contents of the configuration order configuration file 411 and the process content configuration file 412, and performing the configuration change process.

First, the operation manager application 405 of the operation manager 108 receives an input from the operator who performs a configuration change (Step 701). Next, the operation manager application 405 obtains execution method information based on the input from the operator (Step 702). More specifically in Step 702, in the case of the configuration order configuration file 411 and the process content configuration file 412 shown in FIG. 5, when "reload" is input from the operator, the operation manager application 405 of the operation manager 108 refers to the configuration order configuration file 411, to acquire "del_que", "add_que" described in the corresponding action column, as the execution method information.

Next, the operation manager application 405 obtains code information based on the input from the operator (Step 703). More specifically in Step 703, in the case of the configuration order configuration file 411 and the process content configuration file 412 shown in FIG. 5, when "reload" is input from the operator, the operation manager application 405 refers to the configuration order configuration file 411 and the process content configuration file 412, to acquire the execution codes "all_mail_app", "all_store", and "all_store", "all_mail_app", "file", based on the codes C and D and on the codes D, C and E, which are described for each of the execution methods. The execution codes "all_mail_app", "all_store", "all_store", and "all_mail_app", "file" correspond to "del_que" and "add_que" of the execution method information.

Next, the operation manager application 405 of the operation manager 108 displays information of the input from the operator about specific application and data store server on which the configuration change is to be performed, for example, on an application execution screen or other monitor (Step 704). Then, the operation manager application 405 checks whether the operator can accept the content (Step 705). Steps 704 and 705 are provided to prevent improper update that the operator does not expect. This procedure will be described in detail with reference to FIG. 9.

In the following, each execution method obtained in Step 702 is performed with the code information obtained in Step 703 as the argument for the particular execution method (Step 706). In other words, the process is performed for the number of execution methods obtained in Step 702×the number of code information obtained in Step 703. When all of the processes are completed, a series of processes starting from the input from the operator ends.

FIG. 8 expresses the operation manager application 405 of the operation manager 108 in a pseudolanguage, which implements the flow chart of FIG. 7. Note that lines starting with # are comment lines.

The operation manager application 405 first receives the input from the operator with the get user input function. Then, the operation manager application 405 obtains the execution method and code information based on the received commands (get_action and get_codes in the figure).

Next, the operation manager application 405 displays the execution content (show_method in the figure). Then, after the approval from the operator (check_exec in the figure), the operation manager application 405 sequentially processes the execution methods (exec in the figure).

The execution method should have a pointer to the function, for example, such as pseudo code when it is implemented in C language or other programming language. Further, in the execution method, the process is performed according to the code information which is the argument of the execution method, so that the process described herein is branched based on the code information.

Figure 9:
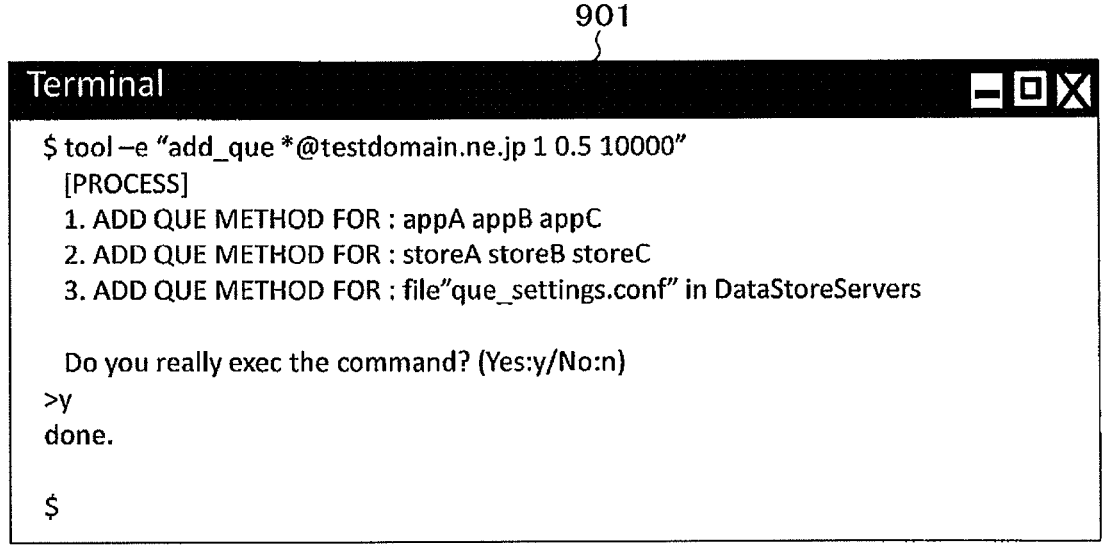
FIG. 9 shows an example of the terminal screen when the operation manager application 405 of the operation manager 108 is performed, according to the first embodiment.

FIG. 9 shows the display process of the execution content that is performed in the flow chart of FIG. 7. A terminal screen 901 is an example of the display screen of the terminal application generally mounted in computers as standard equipment, which enables the configuration change process by the operation manager application 405 of the operation manager 108. The contents shown in the terminal screen 901 are an example to implement Step 701, Step 704, and Step 705 shown in FIG. 7. The operator who performs the operation manager application 405 can check the process reflection order when the command input by the operator is executed, which is displayed on the terminal screen 901 after the input of the executed command. If it is determined by the operator that there is a problem in the displayed content, the operator can stop the process here by inputting NO. On the other hand, the operator inputs YES here to approve the fact that there is no problem in the process content. Then, the particular process is performed after the approval. In this way, it is possible to prevent improper update from being performed without the operator being aware of it, by displaying the process reflection order on the terminal screen 901 and by including the approval process shown in Step 705 of FIG. 7.

FIG. 10 is a view showing a GUI screen used in the operation of the operation manager application 405. A GUI screen 1001 displays the configuration values (parameters) and the current operation state of the whole system that the operation manager application 405 manages. A mouse cursor 1002 is the means for controlling the GUI screen 1001.

The configuration values (parameters) of the queues generated in the whole system are displayed in the top of the GUI screen 1001. The operator using the operation manager application 405 can understand the state of the queues of the whole system by referring to the upper part of the GUI screen 1001. Further, the configuration items of the individual queues are placed in a text box. Thus, the operator can perform the entire configuration of the queues by rewiring the contents of the text box and by clicking the change button on the right side by the mouse cursor 1002. In addition, the operator can add a new queue by the same procedure.

The configuration state of the mail gateway 106 and the data store server 107, as well as the current operation state are displayed in the middle of the GUI screen 1001. With respect to the values configured in the mail gateway 106 and the data store server 107, the operator can refer to the specific configuration values as shown in FIG. 10, by clicking the displayed queue name by the mouse cursor 1002. With respect to the configuration values that do not affect the system, the operator can perform a configuration change on the specified server by the procedure described above.

Further, the process load of each server can be referred to in the current operation state. The operator using the operation manager application 405 can use the load information to help change the configuration of the system. Further, the operator can simulate the performance of the system to determine how much the performance is increased, for example, by adding the mail gateway 106 and the data store server 107, based on the load information. It is also possible to use the current operation state for such applications as automatically adding different servers, based on the simulation results.

An additional interface for adding a server is displayed in the bottom of the GUI screen 1001. For example, when the data store server 107 is added, the operator using the operation manager application 405 inputs "data store server" for the server type, and the IP address and the port number that the data store server 107 to be added will use for the IP address and the port number. Then, the operator can change the configuration of the system by clicking the add button.

FIGS. 11, 12, 13, and 14 are examples of the sequence of the configuration change of the operation manager application 405.

In the sequence of the configuration change of the operation manager application 405, the configuration change processing module 214 of the mail gateway 106, the operation manager application 405 of the operation manager 108, and the data store part 311 and metadata operation part 312 of the data store server 107 exchange data as well as various requests and notifications. However, the actual data to be exchanged includes a payload representing the header information and data body. In the following description, it is described as the data which is the payload portion, instead of the actual data to be exchanged, as well as various requests and various notifications, in order to explain the sequence specific to the configuration change of the operation manager application 405.

Further, when data is stored, obtained, or deleted from the volatile store part 306 of the data store server 107, the exchange required for store, acquisition, or deletion of data is expressed in the form of one request/one response, in order to explain the sequence specific to the data store and acquisition process, even if it is necessary to exchange various manage information in addition to the data.

FIG. 11 is an example of the sequence of the operation manager application 405 in the initial configuration of the whole system, which is described in the configuration order configuration file 411 and the process content configuration file 412 shown in FIG. 5.

First, the operation manager application 405 receives an input from the operator who performs a configuration change (Step 1101). Next, the operation manager application 405 compares the received input of the operator with the configuration order configuration file 411 and with the process content configuration file 412, to display and check the execution content with respect to the operator (Step 1102). When the configuration order configuration file 411 and the process content configuration file 412 shown in FIG. 5 are used, the codes D, C and E are described in the configuration order configuration file 411 for the initial configuration. Thus, it can be found that the operation manager application 405 performs the steps of updating all data store servers, updating all mail gateways, and updating the configuration file. The process of Step 1102 corresponds to Steps 702 to 705 in FIG. 7, corresponding to the fifth to eighth lines of the pseudo codes shown in FIG. 8.

Next, the operation manager application 405 follows the procedure determined in the previous step. More specifically, the operation manager application 405 performs the update process on the metadata 322 in the volatile store part 306 of all the data store servers 107 (Step 1103). Then, the operation manager application 405 performs the update process on the mail gateway application 205 of all the mail gateways 106 (Step 1104). Finally, the operation manager application 405 stores the operation manager configuration file 413 in the non-volatile store part 407 of the operation manager 108 as the configuration file 323 in the volatile store part 306 of the data store server 107 (Step 1105).

Steps 1103, 1104, and 1105 correspond to the execution of "add_que" with the argument of the process target all_store (all data store servers) represented by the code ID, the execution of "add_que" with the argument of the target process all_mail_app (all mail gateway applications) represented by the code C, and the execution of "add_que" with the argument of the process target file (configuration file) represented by the code F, respectively, which are described in the configuration order configuration file 411 and the process content configuration file 412 as shown in FIG. 5.

The update process in Steps 1103 and 1104 is the process of adding all queues of the contents described in the operation manager configuration file 413 and the queue configuration file 423. The operation manager application 405 reads the operation manager configuration file 413 and reflects the contents only for the initial configuration. In the case of the configuration change after the initial configuration, the update process is performed by the operation manager application 405 based on the configuration file 323 stored in the volatile store part 306 of the data store server 107.

By using this procedure, when there is another operation manager 108 that is not initially configured, the operation manager application 405 that is present on the particular server can refer to the configuration values in the current system from the configuration file 323 stored in the volatile store part 306 of the data store server 107. In addition, it is possible to unify the configuration values of the system in the configuration file 323 stored in the volatile store part 306 of the data store server 107.

Further, on the sequence, the operation manager program 405 issues a request to the data store application 305 of multiple data store servers 107 to store the operation manager configuration file 413. This is to provide redundancy, for example, by also storing the operation manager configuration file 413 in the volatile store part 306 of multiple data store servers 107, separately from the function of replication (data multiplexing) that is present in the common data store application, in order to have advantages, such as being able to perform the process from the mail gateway application 205 in parallel, by preparing multiple data store areas by the data store application 305, although one data store area is generally prepared. Further, it is possible to provide one data store area in this sequence, by transmitting a request to one data store application 305 to store the operation manager configuration file 413.

The initial configuration of the whole system, as shown in the sequence of FIG. 11, can be implemented in such a way that the operator executes the initial start command after the start-up of the system. However, for example, when the execution of this command is described in the script and the like in the start-up of the mail gateway application 205 or the data store application 305, the operator can complete the initial configuration only by starting up the system without the need of manual operation.

Figure 12:
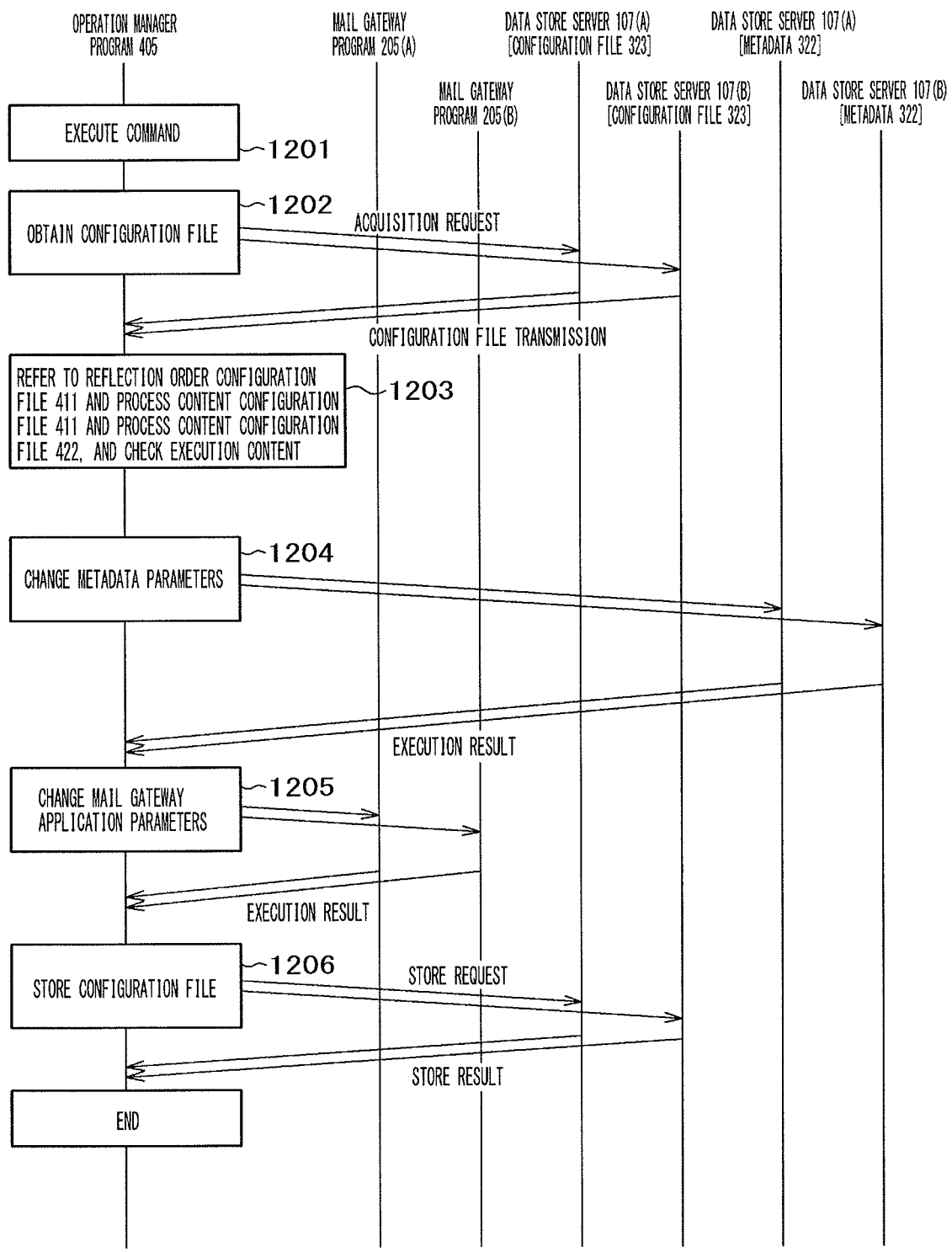
FIG. 12 shows an example of the configuration value (parameter) change sequence according to the first embodiment.

FIG. 12 is a view of an example of the sequence in the configuration change of the operation manager application 405, when a queue is added to all gateway applications and all data store servers described in the configuration order configuration file 411 and the process content configuration file 412 shown in FIG. 5.

First, the operation manager application 405 receives an input from the operator (Step 1201). Next, the operation manager application 405 obtains the configuration file 323 that the data store server 107 manages, as the operation manager configuration file 413 in the non-volatile store part 407 of the operation manager 108 (Step 1202). As described above, in order to have advantages such as being able to perform the process from the mail gateway application 205 in parallel by preparing multiple data store areas by the data store application 305 although one data store area is generally prepared, it is necessary to obtain the configuration file 323 from multiple data store servers 107. There is no problem if the contents of all the configuration files 323 are the same. However, if there is a difference in the contents of the configuration files 323, the operation manager application 405 should determine which one of the configuration files 323 is the latest. Thus, the configuration file 323 includes the version or date information and the like, in addition to the contents that are configured in the configuration file 323. In this way, it is possible to determine which one of the obtained configuration files 323 is valid.

In Step 1202, the operation manager application 405 also checks the validity of the input received from the operator in Step 1201. For example, when the operator generates a queue with the same name despite the queue of the same name being present, the operation manager application 405 can find the queue of the same name in the obtained operation manager configuration file 413. Thus, the operation manager application 405 can return an error to the operator. Note that the operation manager application 405 can return an error not only in the queue addition as described above, but also, for example, in the deletion of a non-existing queue or in the configuration change to a non-existing queue, by the same procedure.

Next, the operation manager application 405 compares the received input of the operator with the contents of the configuration order configuration file 411 and the process content configuration file 412. Then, the operation manager application 405 displays and checks the execution content with respect to the operator (Step 1203). When the configuration order configuration file 411 and the process content configuration file 412 shown in FIG. 5 are used, the codes D, C and E are described in the configuration order configuration file 411 for the queue addition. Thus, it can be found that the operation manager application 405 performs the steps of updating all data store servers, updating all mail gateways, and updating the configuration file.

Next, the operation manager application 405 follows the procedure determined in the previous step. More specifically, the operation manager application 405 performs the update process on the metadata 322 in the volatile store part 306 of all the data store servers 107 (Step 1204). Then, the operation manager application 405 performs the update process on the mail gateway application 205 of all the mail gateways 106 (Step 1205). Finally, the operation manager application 405 stores the operation manager configuration file 413 in the non-volatile store part 407 of the operation manager 108 as the configuration file 323 of the data store server 107 (Step 1206).

Steps 1204, 1205, and 1206 respectively correspond to the execution of "add_que" with the argument of the process target all_store (all data store servers) represented by the code D, the execution of "add_que" with the argument of the process target all_mail_app (all mail gateway applications) represented by the code C, and the execution of "add_que" with the argument of the process target file (configuration file) represented by the code F, which are described in the configuration order configuration file 411 and the process content configuration file 412 as shown in FIG. 5.

Figure 13:
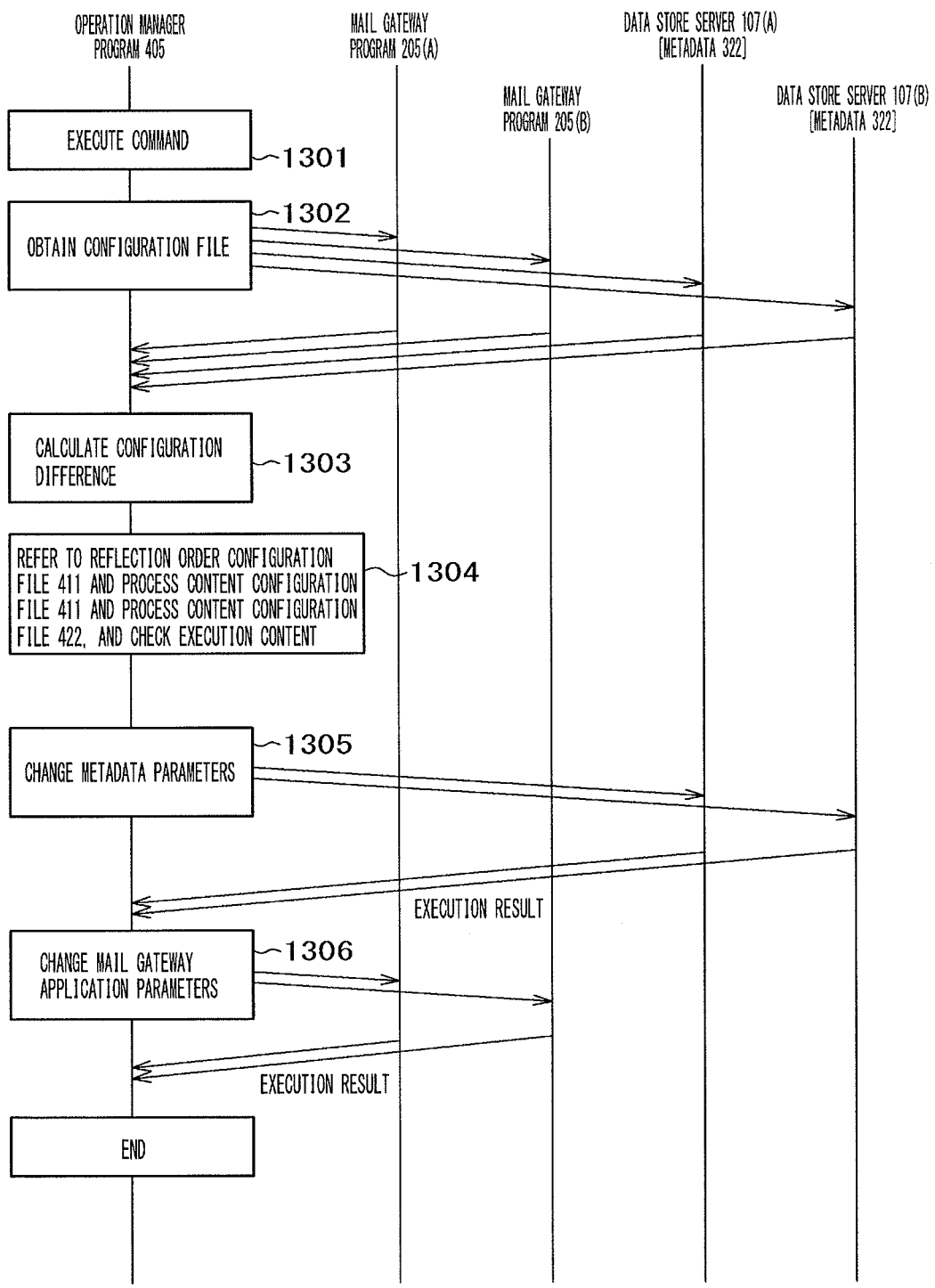
FIG. 13 shows an example of the configuration value change sequence based on the configuration value of a specified application, according to the first embodiment.

FIG. 13 is a view of an example of the configuration value change sequence of the operation manager application 405, based on the configuration value of the specified application. This sequence is based on the configuration value of the specified application, and does not include the process for obtaining and updating the configuration file, which is the base of the configuration change, different from FIGS. 11 and 12. The user of this sequence is limited to when the difference in the configuration values of the metadata 322 managed by all the mail gateway application 205 and all the data store server 107, is allowed to a certain extent. Or it is used when there is a difference in the configuration values for any reason.

First, the operation manager application 405 receives an input from the operator who performs a configuration change (Step 1301). The input of Step 1301 includes a command to reflect the configuration value of the specified application to other servers, as well as the specified application name. Next, the operation manager application 405 obtains the configuration values of the metadata 322 managed by all the mail gateway application 205 and all the data store servers 107 (Step 1302).

Next, the operation manager application 405 checks the presence of a difference between the configuration value of the metadata 322 managed by all the mail gateway applications 205 and all the data store servers 107, which are obtained in Step 1302, and the configuration value of the application specified in Step 1301. Further, the operation manager application 405 checks the contents of the difference (Step 1303). If the configuration difference is not determined in Step 1303, the sequence ends at this point.

Next, the operation manager application 405 compares the received input of the operator with the configuration order configuration file 411 and the process content configuration file 412. Then, the operation manager application 405 displays and checks the execution content with respect to the operator (Step 1304). Some configuration changes may be performed in Step 1305 and subsequent steps, depending on the contents of the configuration difference. For example, if a specific queue is present in the specified application and if the configuration value of the particular queue is different, it is necessary to perform two processes of queue generation and queue configuration change. The following will describe the sequence when a specific queue is present in the specified application as an example of the configuration difference.

The operation manager application 405 follows the procedure determined in the previous step. More specifically, the operation manager application 405 performs the update process on the metadata 322 managed by all the data store servers 107 (Step 1305). Then, the operation manager application 405 performs the update process on the mail gateway application 205 of all the mail gateways 106 (Step 1306). Then, the process ends.

In FIG. 13, the sequence reflects the configuration to the other application based on the configuration value of the application as the reference. However, for example, if a mechanism for automatically and periodically performing this process is adopted, it is possible to periodically synchronize the configuration value of the application as the reference even when there is a change in the application configuration value of any of the applications.

Figure 14:
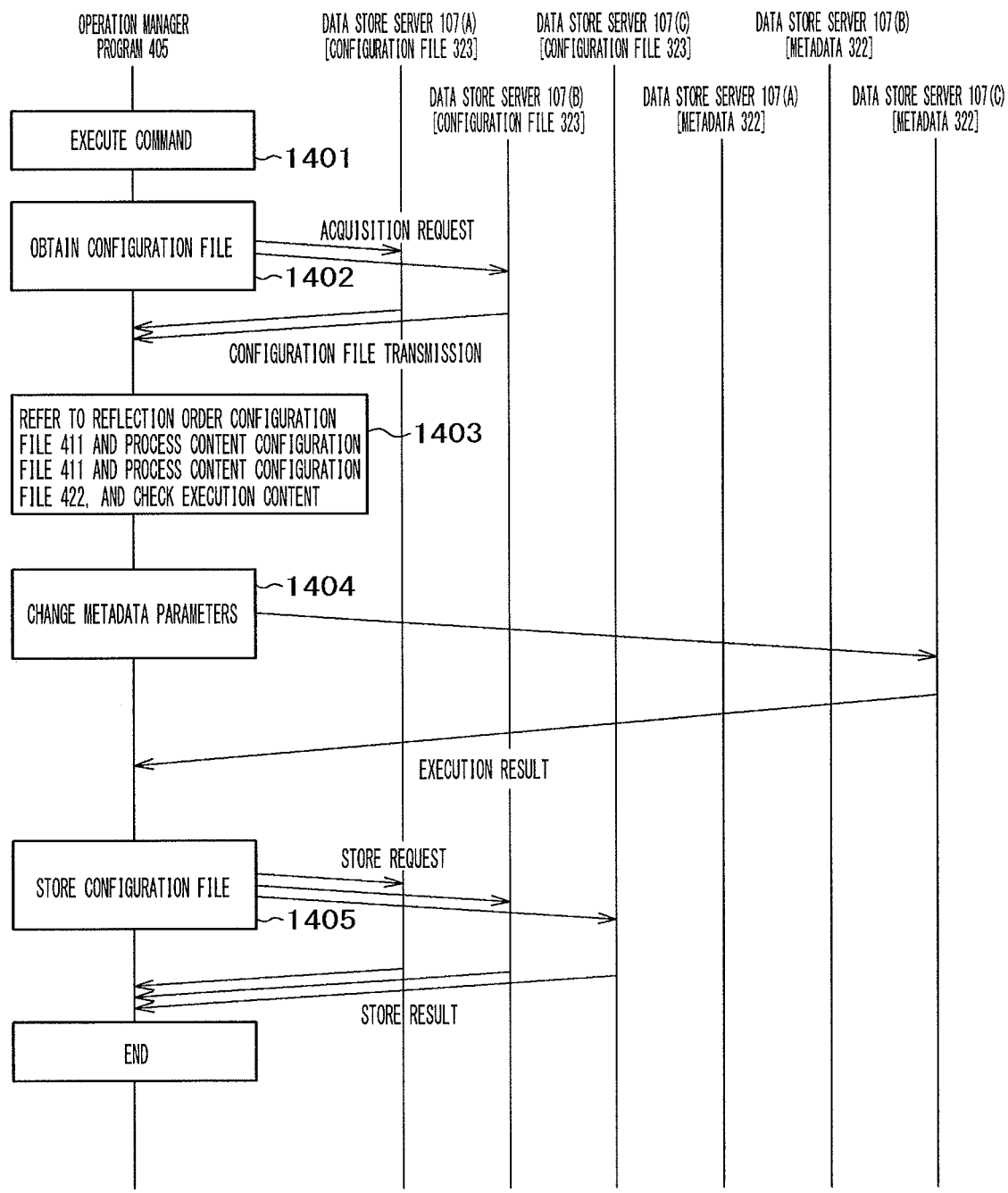
FIG. 14 shows an example of the data store server addition sequence according to the first embodiment.

FIG. 14 is a view of an example of the sequence in the configuration change of the operation manager application 405, when performing the data store server addition described in the configuration order configuration file 411 and the process content configuration file 412 shown in FIG. 5. This sequence shows the process for adding a data store server in the configuration change process of the system, which is shown in the bottom of the operation manager application GUI shown in FIG. 10.

First, the operation manager application 405 receives an input from the operator (Step 1401). Next, the operation manager application 405 obtains the configuration file 323 that the data store server 107 manages, as the operation manager configuration file 413 on the non-volatile store part 407 of the operation manager 108 (Step 1402). The acquisition of the configuration file 323 is described in Step 1202 of FIG. 12, so that the description thereof is omitted.

In Step 1402, the operation manager application 405 also checks the validity of the input received from the operator in Step 1201. For example, if the operator adds a data store server despite the data store server of the same IP address and the same port number being present, the operation manager application 405 can find the information of the data store server with the same configuration in the obtained operation manager configuration file 413. Thus, the operation manager application 405 can return an error to the operator.

Next, the operation manager application 405 compares the received input of the operator with the configuration order configuration file 411 and the process content configuration file 412. Then, the operation manager application 405 displays and checks the execution content with respect to the operator (Step 1403). When the configuration order configuration file 411 and the process content configuration file 412 shown in FIG. 5 are used, the codes B and E are described in the configuration order configuration file 411 for the data store server addition. Thus, it can be found that the operation manager application 405 performs the steps of updating all data store servers and updating the configuration file.

Next, the operation manager application 405 follows the procedure determined in the previous step. More specifically, the operation manager application 405 performs the update process on the metadata 322 on the volatile store part 306 of the data store server 107 to be added (Step 1404). In this process, there is a need that the state of the specified data store server should be the same as the state of the data store server 107 actually running in the system. Thus, it is necessary to perform the addition process of the queue that is already generated from the generation of metadata.

Finally, the operation manager application 405 stores the operation manager configuration file 413 on the non-volatile store part 407 of the operation manager 108 as the configuration file 323 of the data store server 107 (Step 1405). When another data store area is added by using the added data store server, the redundancy of the configuration file 323 can be achieved by storing the configuration file 323 also in the added data store server as shown in the sequence of the figure.

Steps 1404 and 1405 respectively correspond to the execution of "add_store with the argument of the process target only store (one specified data store server) represented by the code D, and the execution of "add_store" with the argument of the process target file (configuration file) represented by the code E, which are described in the configuration order configuration file 411 and the process content configuration file 412 as shown in FIG. 5.

Figure 15:
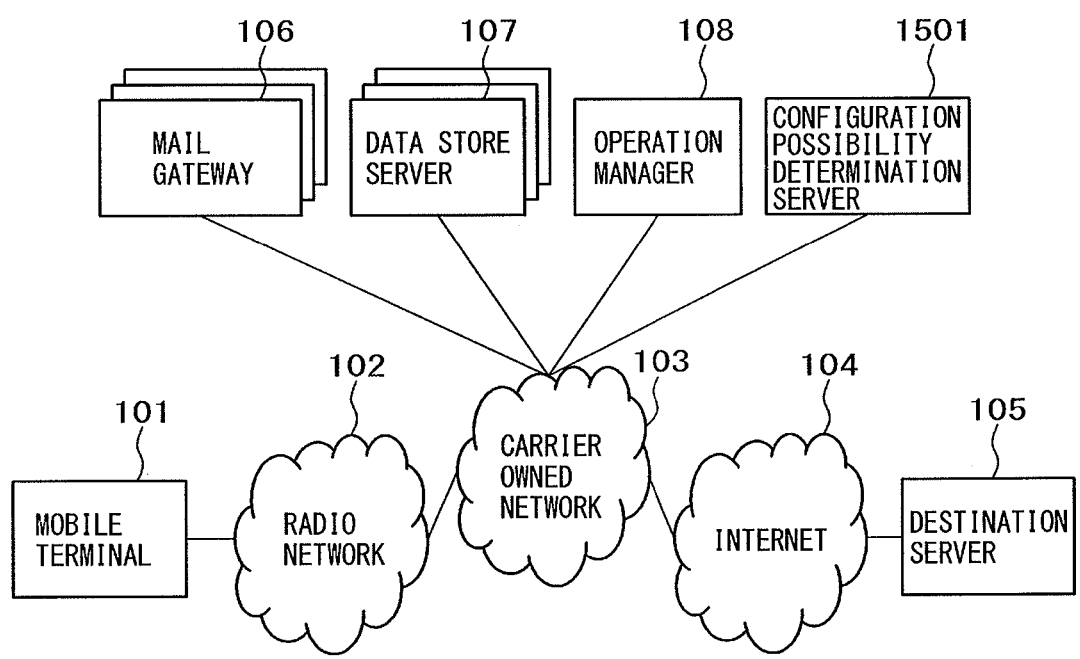
FIG. 15 shows an example of the system configuration according to a second embodiment.

FIG. 15 is an example of the system configuration according to a second embodiment.

The mobile terminal 101 is coupled to the carrier owned network 103 through the radio network 102. The radio network 102 is the wireless network coupling the mobile terminal 101 and the carrier owned network 103. The carrier owned network 103 is the network coupling the radio network 102, the internet 104, the mail gateway 106, the data store server 107, the operation manager 108, and the configuration possibility determination server 1501.

The destination server 105 performs gateway of mail with the mail gateway 106 through the internet 104. The mail gateway 106 is coupled to the carrier owned network 103. The mail gateway 106 receives a mail transmitted by the mobile terminal 101 to the carrier owned network 103, and stores the received mail in the data store server 108. Then, the mail gateway 106 obtains the mail from the data store server 108 and transmits to the destination server 105. In the present embodiment, the load is distributed in multiple mail gateways 106. Each specific one of the gateways is represented by a number with a letter of the alphabet, such as the mail gateway 106a, and they are collectively designated by the reference numeral 106 without a suffix.

The data store server 107 is coupled to the carrier owned network 103. The data store server 107 receives and stores data such as mail from the mail gateway 106. The data store server 107 is a message store such as that represented by an in-memory KVS. In the present embodiment, the load is distributed in multiple data store servers 107. Each specific one of the data store servers is represented by a number with a letter of the alphabet, such as the data store server 107a, and they are collectively designated by the reference numeral 107 without a suffix. Further, the data stored in the data store server 107a is redundant in multiple data store servers in order to prevent the loss of data stored in the data store server 107a.

The operation manager 108 is coupled to the carrier owned network 103. The operation manager 108 performs the configuration change process on the mail gateway 106, the configuration change process on the data store server 107, and the store of the configuration state. Although there is one operation manager 108 in the figure, multiple operation managers 108 may be provided.

The configuration possibility determination server 1501 is coupled to the carrier owned network 103. When the operation manager 108 performs the configuration change on the mail gateway 106 and the data store server 107, the configuration possibility determination server 1501 determines whether the particular configuration change process is possible.

Figure 16:
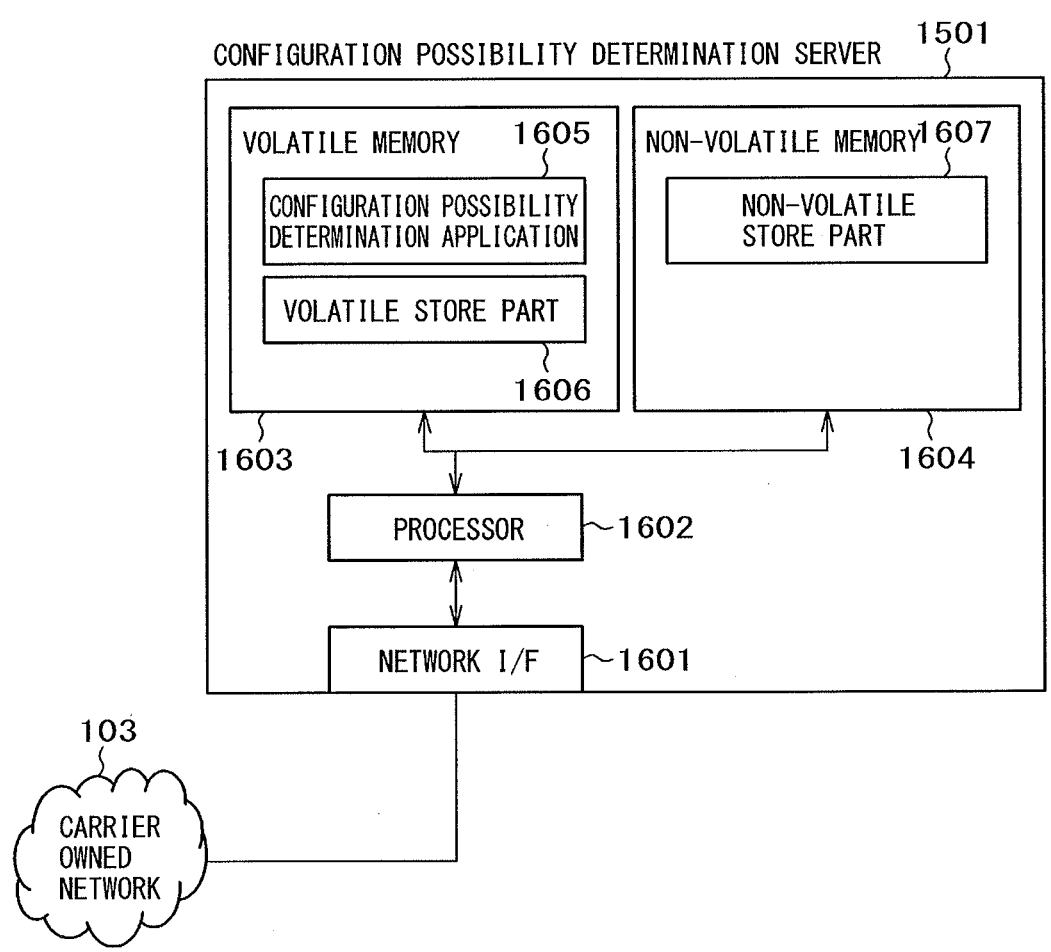
FIG. 16 shows an example of the configuration of configuration possibility determination server 1501 to which each embodiment is applied, according to the second embodiment.

FIG. 16 is a view of the hardware configuration of the information processing device that implements the configuration possibility determination server 1501.

The information processing device for implementing the configuration possibility determination server 1501 includes a network I/F 1601, a processor 1602, a volatile memory 1603, a non-volatile memory 1604, and an internal communication line such as a bus for connecting these components. The configuration possibility determination server 1501 is coupled to the carrier owned network 103 through the network I/F 1601.

The volatile memory 1603 includes a configuration possibility determination application 1605, and a volatile store part 1606 for storing data. The configuration possibility determination application 1605 includes various control programs that implement the process for determining whether the configuration change process is possible when the operation manager application 405 of the operation manager 108 performs the configuration change. The control programs of the configuration possibility determination application 1605 are executed by the processor 1602. The volatile store part 1606 stores the data managed by the configuration possibility determination application 1605.

The non-volatile memory 1604 includes a non-volatile store part 1607. The non-volatile store part 1607 stores the data managed by the configuration possibility determination application 1605.

Figure 17:
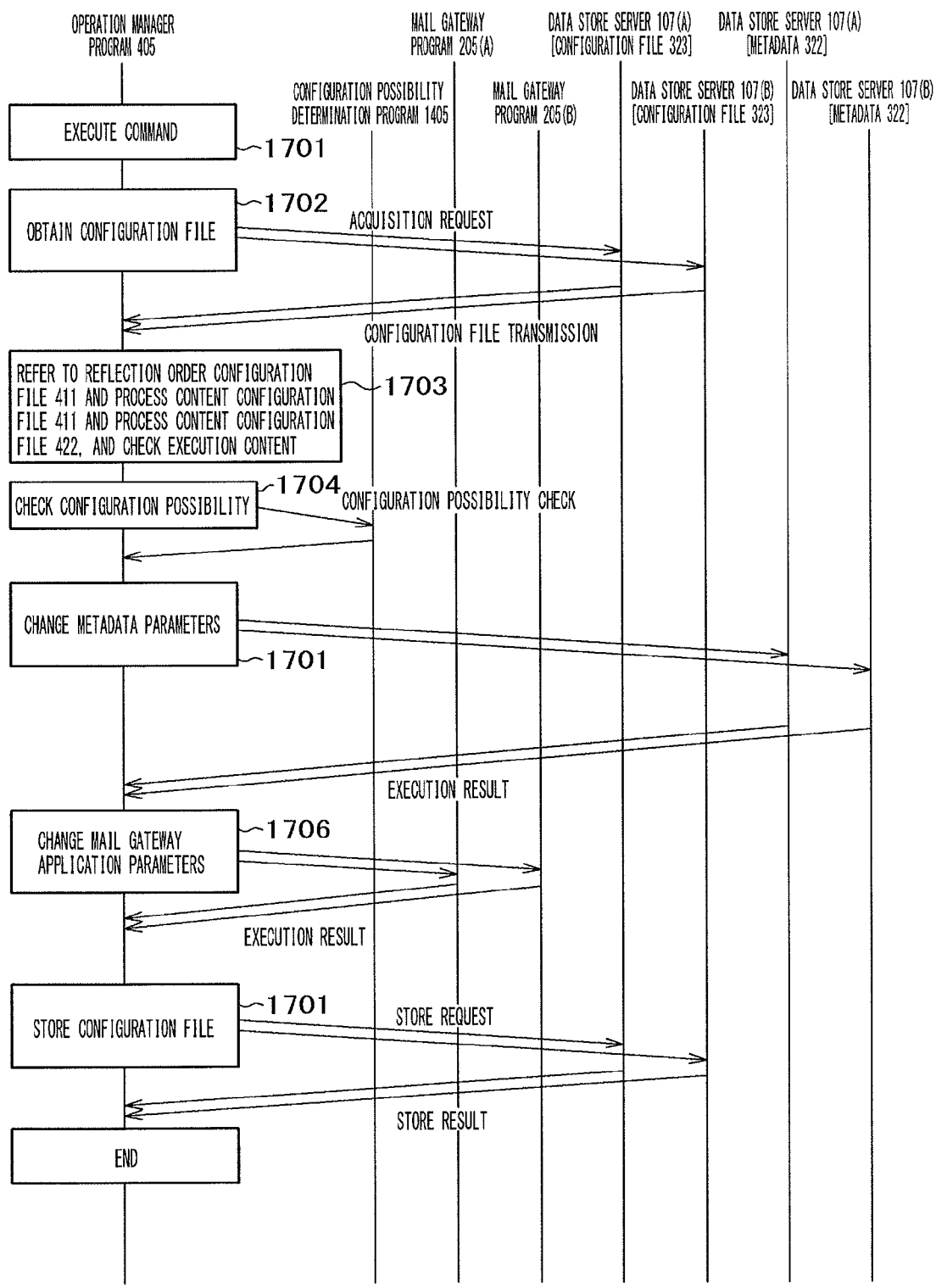
FIG. 17 shows an example of the configuration value change sequence when the configuration possibility determination server 1501 is used according to the second embodiment.

FIG. 17 is a view of an example of the sequence when the configuration possibility determination server 1501 is used in the configuration change of the operation manager application 405, in which queue addition is performed on all gateway applications and all data store servers described in the configuration order configuration file 411 and the process content configuration file 412 shown in FIG. 5. In the following description of FIG. 17, similar to FIGS. 11, 12, 13, and 14, it is described as the data which is the payload portion, instead of the actual data to be exchanged, as well as various requests and various notifications, in order to explain the sequence specific to the configuration change of the operation manager application 405. Further, when the data is stored, obtained, or deleted from the volatile store part 306 of the data store server 107, the exchange required for store, acquisition, or deletion of data is expressed in the form of one request/one response, in order to explain the sequence specific to the data store and acquisition process, even if it is necessary to exchange various management information other than the data. Further, the operation of the sequence is the same as shown in FIG. 12 except Step 1704 that the configuration possibility determination application 1605 involves, so that the description is simplified except for the description of Step 1704.

First, the operation manager application 405 receives an input from the operator who performs a configuration change (Step 1701). Next, the operation manager application 405 obtains the configuration file 323 managed by the data store server 107 as the operation manager configuration file 413 on the non-volatile store part 407 of the operation manager 108 (Step 1702).

Next, the operation manager application 405 compares the received input of the operator with the configuration order configuration file 411 and the process content configuration file 412. Then, the operation manager application 405 displays and checks the execution content with respect to the operator (Step 1703). When the configuration order configuration file 411 and the process content configuration file 412 shown in FIG. 5 are used, the codes D, C and E are described in configuration order configuration file 411 for the case of the queue addition. Thus, it can be found that the operation manager application 405 performs the steps of updating all data store servers, updating all mail gateways, and updating the configuration file.

Next, the operation manager application 405 checks with the configuration possibility determination application 1605 to determine whether the input contents of the configuration change can be reflected to the mail gateway application 205 and the data store application 305, which are the configuration change target (Step 1704).

In Step 1704, if a configuration possibility determination program 1405 determines that the input contents of the configuration change may not be reflected to either one or both of the mail gateway application 205 and the data store application 305 which are the configuration change target, the operation manager program 405 notifies the operator of the failure of the configuration change, for example, by displaying on the terminal screen, and ends the process.

This is the case, for example, when the value of the configuration item that affects the mail gateway application 205 is invalid for the mail gateway application 205 in the configuration change of queue addition. In this case, if the check process such as Step 1704 is not present, the configuration change to the mail gateway application 205 may actually continue until the process failed. In such a case, a mismatch occurs between configuration values due to the configuration change order, such that the process is not performed on the mail gateway application 205 although the update process of the metadata 322 on the data store application 305 is completed.

It is possible to prevent the above phenomenon by including check logic in the operation manager application. However, it is necessary to change the operation manager application 405 each time the mail gateway application 205 or the data store application 305 is changed.

Thus, the configuration possibility determination application 1605 is newly provided in order to save the costs for changing the operation manager application 405. The configuration possibility determination application 1605 may determine, including the configuration change reflection possibility logic that is equivalent to the mail gateway application 205 and the data store application 305, in the application itself. However, it may also be implemented by including the logic for inquiring about the possibility of the configuration in advance, in the mail gateway application 205 or in the data store application 305.

According to this configuration, there is no need to change the configuration possibility determination application 1605 each time the mail gateway application 205 or the data store application 305 is changed. Further, in this case, it is also possible to include the logic for inquiring about the possibility of the configuration in the operation manager application 405, in a state in which the dependency relationship between each of the applications is removed.

Next, the operation manager application 405 follows the procedure determined in the previous step. More specifically, the operation manager application 405 performs the update process on the metadata 322 on the volatile store part 306 of all the data store servers 107 (Step 1705). Then, the operation manager application 405 performs the update process on the mail gateway application 205 of all the mail gateways (Step 1706). Finally, the operation manager application 405 stores the operation manager configuration file 413 on the non-volatile store part 407 of the operation manager 108 as the configuration file 323 of the data store server 107 (Step 1707).

Steps 1705, 1706; and 1707 respectively correspond to the execution of add_que" with the argument of the process target all_store (all data store servers) represented by the code D, the execution of "add_que" with the argument of the process target all_mail_app (all mail gateway applications) represented by the code C, and the execution of "add_que" with the argument of the process target file (configuration file) represented by the code E, which are described in the configuration order configuration file 411 and the process content configuration file 412 as shown in FIG. 5.

What is claimed is:

1. A distributed processing system comprising:
a plurality of data store servers for storing data;
a plurality of process servers for performing data store process and data acquisition process with the data store server; and
an operation manager for performing configuration process involving system configuration for the process server and the data store server,
wherein the data store server or the operation manager manages the configuration order information for the process server and the data store server, with respect to each system configuration content,
wherein the operation manager determines the configuration process required for system configuration, as well as the execution order of the particular configuration process, according to the required system configuration content, and
wherein the operation manager performs the determined configuration process on the process server and the data store server, according to the determined execution order.

2. The distributed processing system according to claim 1,
wherein the determined configuration process performed includes a process for storing the configuration order information in the data store server, and
wherein the operation manager changes the configuration content by obtaining the stored configuration order information from the data store server, and by determining the configuration process required for system change, as well as the execution order of the particular configuration process, based on the obtained configuration order information and on the required system change content.

3. The distributed processing system according to claim 2,
wherein the operation manager checks the validity of the required system change content, based on the obtained configuration order information and on the required system change content.

4. The distributed processing system according to claim 1,
wherein the operation manager obtains the configuration content from the plurality of process servers including a process server as the reference, and from the plurality of data store servers including a data store server as the reference,
wherein the operation manager calculates the difference between the configuration content obtained from the process server as the reference and the data store server as the reverence, and the required system configuration content to check the necessity of configuration process, and
wherein when the system change process is necessary for either one or both of the process server and the data store server, the operation manager determines the server as the system change process target, the configuration process required for the system configuration of the particular server, and the execution order of the particular configuration process.

5. The distributed processing system according claim 1, wherein the configuration order information that the data store server or the operation manager manages, includes the process name to be executed, the process target used as the argument when the process is performed, and the execution order information of the process using the argument, with respect to each command name specified in the configuration process.

6. The distributed processing system according to claim 2, wherein the configuration order information that the data store server or the operation manager manages, includes the process name to be executed, the process target used as the argument when the process is performed, and the execution order information of the process using the argument, with respect to each command name specified in the configuration process.

7. The distributed processing system according to claim 3, wherein the configuration order information that the data store server or the operation manager manages, includes the process name to be executed, the process target used as the argument when the process is performed, and the execution order information of the process using the argument, with respect to each command name specified in the configuration process.

8. The distributed processing system according to claim 4, wherein the configuration order information that the data store server or the operation manager manages, includes the process name to be executed, the process target used as the argument when the process is performed, and the execution order information of the process using the argument, with respect to each command name specified in the configuration process.

9. The distributed processing system according to claim 2, wherein the distributed processing system comprises a plurality of operation managers, and wherein the data store server manages the configuration order information such that the configuration order information can be accessed from the plurality of operation managers.

10. The distributed processing system according to claim 1, further comprising a configuration possibility determination server for determining the possibility of the configuration process that the operation manager will perform,
wherein the operation manager inquires to the configuration possibility determination server about whether the determined configuration process is possible, before the determined configuration process is performed.

11. The distributed processing system according to claim 2, further comprising a configuration possibility determination server for determining the possibility of the configuration process that the operation manager will perform,
wherein the operation manager inquires to the configuration possibility determination server about whether the determined configuration process is possible, before the determined configuration process is performed.

12. The distributed processing system according to claim 3, further comprising a configuration possibility determination server for determining the possibility of the configuration process that the operation manager will perform,
wherein the operation manager inquires to the configuration possibility determination server about whether the determined configuration process is possible, before the determined configuration process is performed.

13. The distributed processing system according to claim 4, further comprising a configuration possibility determination server for determining the possibility of the configuration process that the operation manager will perform,
wherein the operation manager inquires to the configuration possibility determination server about whether the determined configuration process is possible, before the determined configuration process is performed.

* * * * *